US012710138B2

(12) United States Patent
Del Rio Gomez et al.

(10) Patent No.: US 12,710,138 B2

(45) Date of Patent: Aug. 18, 2026

(54) SYSTEM, DEVICES AND METHODS FOR MEASURING A FILL LEVEL IN CONTAINERS

(71) Applicant: SMART PROJECTS LLC, Lehi, UT (US)

(72) Inventors: Eduardo Del Rio Gomez, Lehi, UT (US); Ernesto Mijangos Rivera, Lehi, UT (US)

(73) Assignee: SMART PROJECTS LLC, Lehi, UT (US)

( * ) Notice: Subject to any disclaimer, the term of this patent is extended or adjusted under 35 U.S.C. 154(b) by 0 days.

(21) Appl. No.: 18/280,475

(22) PCT Filed: Mar. 15, 2022

(86) PCT No.: PCT/IB2022/052342

§ 371 (c)(1),
(2) Date: Sep. 6, 2023

(87) PCT Pub. No.: WO2022/195486

PCT Pub. Date: Sep. 22, 2022

(65) Prior Publication Data

US 2024/0142059 A1 May 2, 2024

(51) Int. Cl.
*F17C 13/02* (2006.01)
*G01F 23/2962* (2022.01)

(52) U.S. Cl.
CPC ........ *F17C 13/02* (2013.01); *F17C 2250/034* (2013.01); *F17C 2250/0417* (2013.01); *F17C 2250/0491* (2013.01); *G01F 23/2962* (2013.01)

(58) Field of Classification Search
CPC ... F17C 13/02; F17C 13/021; F17C 2250/061
See application file for complete search history.

(56) References Cited

U.S. PATENT DOCUMENTS

| | | | | |
|---|---|---|---|---|
| 4,926,015 | A * | 5/1990 | Takahashi | H01H 36/02 361/736 |
| 5,018,387 | A | 5/1991 | Myneni | |
| 6,629,457 | B1 * | 10/2003 | Keller | G01F 23/2968 73/304 C |
| 10,180,343 | B2 * | 1/2019 | Merker | G01F 23/2962 |
| 10,925,118 | B1 * | 2/2021 | Lin | G06F 16/50 |

(Continued)

FOREIGN PATENT DOCUMENTS

| | | | |
|---|---|---|---|
| CN | 109781217 | A | 5/2019 |
| CN | 113405629 | A | 9/2021 |
| JP | 2001336696 | A * | 12/2001 |

*Primary Examiner* — Keith M Raymond

(74) *Attorney, Agent, or Firm* — McDonald Hopkins LLC

(57) ABSTRACT

A system, measuring device and related methods for measuring a fill level in a container or tank are disclosed. The measuring device utilizes high-frequency signals for sensing a fill level in a tank filled with a liquid such as, for example, liquefied petroleum gas, in particular propane and butane, oxygen, nitrous oxide and anesthesia, $CO_2$, nitrogen, gas air, helium, generally liquefied gases, but also water, oils, or any other liquid either pressurized or not pressurized. The measuring device being capable of communicating wirelessly and remotely with other devices in the system to calculate and communicate the fill level in the container.

2 Claims, 10 Drawing Sheets

(56) References Cited

U.S. PATENT DOCUMENTS

| | | | | |
|---|---|---|---|---|
| 2006/0283244 | A1* | 12/2006 | Schonlau ................ | G01F 23/22<br>73/291 |
| 2012/0073312 | A1* | 3/2012 | Cutting .................. | A01N 1/146<br>62/62 |

* cited by examiner

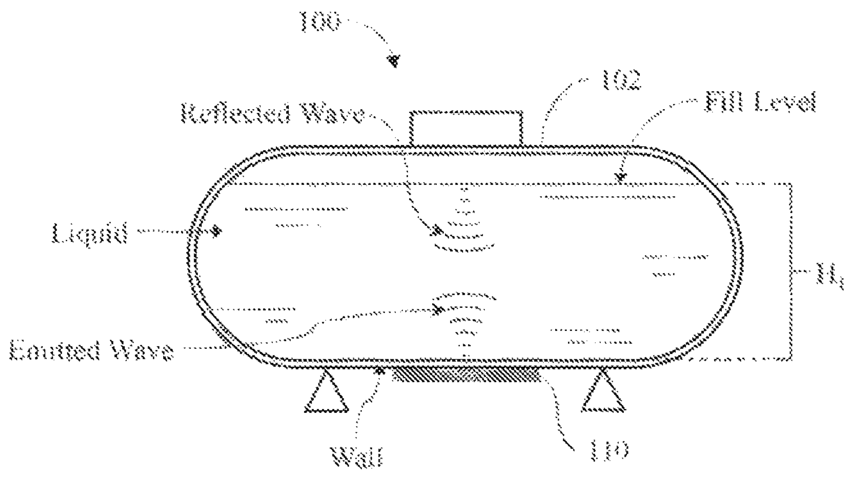
Fig. 1
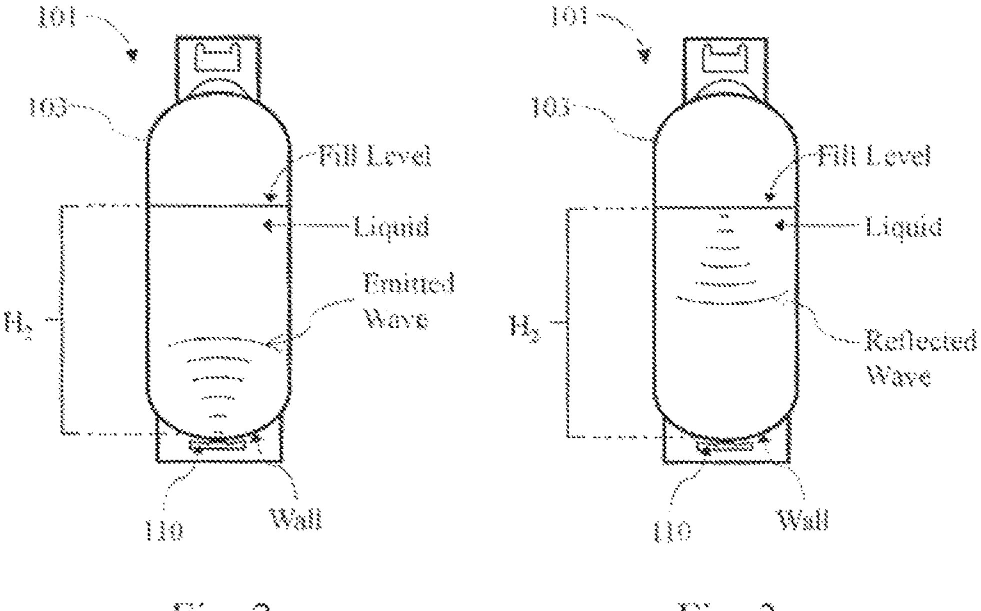
Fig. 2
Fig. 3

SYSTEM, DEVICES AND METHODS FOR MEASURING A FILL LEVEL IN CONTAINERS

FIELD OF TECHNOLOGY

The present disclosure relates generally to a measuring system, measuring devices and methods for sensing or measuring a fill level in one or more containers, in particular fluid tanks such a fluid tank may include one or more fluids including, but not limited to: liquefied petroleum (LP) gas, propane, butane, oxygen, nitrous oxide, anesthesia, carbon dioxide ($CO_2$), nitrogen, gas air, helium, generally liquefied gases, water, oils, fluid polymers, and/or any other liquid either pressurized or not pressurized. The present disclosure also relates to a measuring device that utilizes high-frequency ultrasonic waves for sensing or measuring a fill level in a container. The measuring device being capable of communicating wirelessly and remotely with other devices in a measuring system to calculate and/or communicate the fill level in the container. The present disclosure also relates to methods for measuring a fill level in a container and methods for monitoring consumption of contents in containers for determined periods of time. The present disclosure also relates to a measuring device and related methods to attenuate noise signals during measuring or sensing of a fill level in a container.

BACKGROUND

There are several ways and techniques to determine the fill level of a fluid inside a container or a tank. A common technique to calculate a fill level in a container is based on measurements of weight and/or pressure. Other techniques to calculate a fill level may further include measurements of temperature, volume, density, or a combination of the same.

Nevertheless, typical devices employed to measure, for example, pressure in a container do not take account of environmental factors, such as ambient temperature, and temperature inside the container, and/or density of the material inside the container. It is well known in the art that ambient temperature may have a direct impact on the pressure inside the container, whereby this parameter, and others, are key for a more accurate and reliable measurement of a fill level in a container.

There are known systems which make use of a measuring device that is mounted to an outer wall of the container to be measured. The measuring device generates an ultrasonic wave and receives an echo of said ultrasonic wave. By knowing the density of the contents inside the container and the geometry of the container, the fill level can then be determined based on the so-called "time-of-flight" feature which consists in the time that passes between generating the ultrasonic wave and receiving the echo.

These known systems and measuring devices suffer from several important disadvantages and drawbacks. For example, misalignment or poor coupling of the measuring device to the wall of the container to be measured results in obtaining inaccurate or false measurements or obtaining no measurement at all. It has been proposed to provide the measuring device with a coupling means that is designed to complement the shape of the container's wall. However, such coupling means is designed to adapt to the shape of specific containers making the measuring device inadequate or unusable on containers having other shapes or sizes. In addition, the use of such coupling means increases the cost and complexity for installing and servicing the measuring device. In fact, some configurations for the coupling means may result in the measuring device being disposable or not re-usable after removal from the container due to damage of the coupling means and/or of the measuring device.

Furthermore, known systems do not take advantage of wireless communications within a local network of the user to report measurements, calculations and consumption to user mobile devices. Also, known systems have not yet exploited the unlimited capacities and advantages offered by mobile applications or "apps" running on mobile devices, such as smartphones, tablets, personal computers, etc. In fact, measuring systems known to date require a connection to Internet to obtain calculations or measurements carried out by a measuring device. That is, communication between a user mobile device and a measuring device is only possible through a connection to Internet.

Moreover, known systems and measuring devices are often configured to sense or measure a limited variety of liquids or they are configured to work for very specifically shaped containers or tanks. In fact, known measuring systems are unable to be reprogrammed depending on the user's need. That is, in a measuring system that is configured to measure, for example, the fill level of a certain liquid, e.g. propane, in a cylindrical tank of a certain capacity, e.g., 1000 liters, said system and in particular the measuring device cannot be reprogrammed to measure other fluids or to measure the same fluid in containers having a different fill capacity. This means that neither the measuring system nor the measuring device itself is adaptable to the user's needs.

Further, known measuring devices are often characterized for being high energy consumers, thus resulting in expensive-to-operate devices. In addition, known measuring devices are difficult to give service or maintenance and its components, in particular the ultrasound generating means, are often damaged due to environmental effects and/or improper handling or installation during use.

It is thus desirable to have a measuring system and measuring device configured to sense with a high level of reliability a fill level in a wide variety of containers or tanks filled with a wide variety of liquids or gases, either pressurized or not pressurized, ensuring that the measuring device is easy to install, operate, and give maintenance, and which is also able to communicate remotely and wirelessly with user mobile devices while reducing the power consumption.

SUMMARY

To solve the drawbacks in the state-of-art, certain aspects of the invention relate to a measuring device configured to measure or sense a fill level in a container or tank with any type of liquid or gas, pressurized or not pressurized, such as, without limitation, liquefied petroleum gas (LPG), propane, butane, oxygen ($O_2$), nitrous oxide ($NO_x$), anesthesia, carbon dioxide ($CO_2$), nitrogen ($N_2$), gas air, helium (He), generally liquefied gases, water, oils, fluid polymers, with the container or tank having any shape and capacity.

Additional aspects of the invention relate to a measuring device configured to be programmable and reprogrammable to sense and calculate a fill level of a wide variety of liquids or gases in a wide variety of containers or tanks by inputting or selecting features of contents and geometry of the container through the use of a user mobile device. That is, the measuring device according to certain aspects of the invention can be used to measure as many containers as needed disregarding the contents thereof all with a very high level of precision and reliability and lower power consumption features.

Additional aspects of the invention relate to a measuring device configured to attenuate or at least reduce noise signals during measurement of ultrasonic signals.

Additional aspects of the Invention relate to a measuring device configured as a two-part device including a main body and a detachable sensor assembly.

Additional aspects of the invention relate to a measuring device which can be connected to a plurality of sensor assemblies, one at a time, to sense or measure a fill level in a plurality of containers or tanks.

Additional aspects of the invention relate to a detachable sensor assembly configured to be bonded by suitable means to an outer wall of a container or tank to be measured, wherein the bonding of the detachable sensor assembly and the outer wall of the container or tank can be done, for example, by gluing and pressing.

Additional aspects of the invention relate to a measuring device configured to communicate remotely and wirelessly with a plurality mobile devices such as, without limitation, mobile phones, smartphones, computers, tablets, personal digital assistant (PDA), to report at least one signal related to a calculated or measured fill level of a plurality of containers or tanks to a user to determine consumption level in a determined period of time.

Additional aspects of the invention relate to a low-power measuring device configured to be easily installed or mounted on an outer wall of a container or tank to be measured, the low-power measuring device is configured to turn on and off under certain criteria to avoid accelerated consumption of a power source.

Additional aspects of the invention relate to a measuring device with a monitoring mode so that the device can perform measurements with increased frequency; the frequency can be set by a user making use of a software application running on a mobile device.

Additional aspects of the invention relate to a measuring device configured to communicate with at least one mobile device via a local area network (LAN) or a wide area network (WAN) through different protocols such as, but not limited to, HTP, SSL, HTTPS, TCP/UDP, Internet Protocol (IP), MQTT, IEEE 802.11, CSMA/CA, SLP, SMTP, XMPP, SMPP, APN.

Additional aspects of the invention relate to a measuring device configured to act as a hot-spot (access spot) so that a user may establish communication directly with the measuring device through a local network, the measuring device can include a communications module so that the need for Internet connection is eliminated.

Additional aspects of the invention relate to a measuring device configured to determine and communicate its geolocation; the measuring device can include a GPS module enabling the measuring device to acquire its geolocation.

Additional aspects of the invention relate to a measuring device configured to communicate with mobile devices via a global cell network; the measuring device can include a GPRS module, equivalent or similar enabling the measuring device to communicate via 3G, 4G, 4.5G, etc. protocols.

Additional aspects of the invention relate to a measuring device configured to store measurements taken by the device; the measuring device can include a data base stored on a memory.

Additional aspects of the invention relate to a measuring device configured to measure temperature in the ambient and/or inside the tank; the measuring device can include at least one temperature sensor.

Additional aspects of the invention relate to a measuring device configured for easy installation and easy maintenance, in particular configured for easy replacement of a power source.

Additional aspects of the invention relate to a measuring system, related measuring devices and methods for monitoring a fill level in a plurality of containers or tanks, wherein the measuring devices are configured to communicate remotely with each other via wired and/or wireless networks.

Additional aspects of the invention relate to software applications and/or computer readable mediums running on mobile devices for measuring, calculating and monitoring a fill level in at least one container or tank and determine consumption for determined periods of time.

According to certain aspects of the invention, a measuring device is configured to measure or sense a fill level in a container or tank. The measuring device can be removably coupled to an outer wall of a container or tank, for example to an outer bottom wall of the container or tank. The measuring device includes an ultrasonic transducer configured to generate and emit an ultrasonic wave able to traverse or pass through the container's wall and to travel through a liquid or gas inside the container; the ultrasonic transducer includes a sensor assembly configured to sense a reflected ultrasonic wave. The measuring device is configured such that, depending on the time-of-flight sensed and other parameters such as, without limitation, size of container, ambient temperature, density of the fluid(s) stored inside the container, etc., the measuring device may calculate the fill level in the container or tank. The measuring device is also configured to remotely communicate the fill level measurement/calculation to at least one mobile device via wired and/or wireless networks, for example via Internet. The measuring device is also configured such that an ultrasonic generating means thereof is detachable from the measuring device and the ultrasonic generating means is installed in such a way that it reduces noise signals which are often caused by environmental effects like wind, dust, humidity, etc.

The measuring device according to certain aspects of the invention is also configured to attenuate or at least reduce noise signals and to compensate errors in the measurements and calculations that are due to ambient factors, for example temperature, pressure, etc., and due to variations in standard features of the container's materials and other parameters of the liquid or gas inside the container, for example temperature, pressure, density, etc.

The measuring device according to certain aspects of the invention can be provided with a coupling structure configured to attach the measuring device in a non-permanent way to a container's wall.

The measuring device according to certain aspects of the invention can be provided with a noise attenuator configured to attenuate noise signals that may be present at the time of generating, transmitting and/or receiving an ultrasonic wave.

According to aspects of the invention, a measuring system for sensing and monitoring a fill level in at least one container or tank is provided. The measuring system can include at least one measuring device and at least one mobile device, such as a mobile phone, computer, etc., in communication with the at least one measuring device via wired and/or wireless networks.

According to aspects of the invention, a method for measuring or sensing a level of a liquid inside a container is disclosed.

According to aspects of the invention, a method for compensating error measurements and correcting a calculated level value is disclosed.

According to aspects of the invention, a method for using a measuring device is disclosed.

According to aspects of the invention, the measuring device is made of wear resistant material to ensure a long service life-time.

According to aspects of the invention, the measuring device is inexpensive, easy to operate, easy to give service or maintenance, and easy to manipulate to replace a power source.

These and other aspects and advantages of the present invention and the solution to the above objects and even others will be apparent to those skilled in the art from the reading of the following detailed description of embodiments of the invention which, together with the accompanying drawings, illustrate aspects of the invention without limitation.

BRIEF DESCRIPTION OF THE DRAWINGS

The accompanying drawings are used to schematically illustrate non-limiting exemplary embodiments of the present invention. The above and other advantages and features of the invention will become more apparent and the invention will be better understood by reading the following detailed description with reference to the accompanying drawings. It should be understood that all directions, shapes, angles, dimensions including lengths and thicknesses, distances and so on shown in these drawings are given only for illustrative purposes and are not necessarily to scale, and the invention is not limited to them. In the following figures like designations denote like members unless otherwise indicated, within:

FIG. 1 schematically illustrates a fill level measuring system according to certain aspects of the invention;

FIGS. 2 and 3 schematically illustrate a fill level measuring system according to certain aspects of the invention:

DETAILED DESCRIPTION

Figure 4:
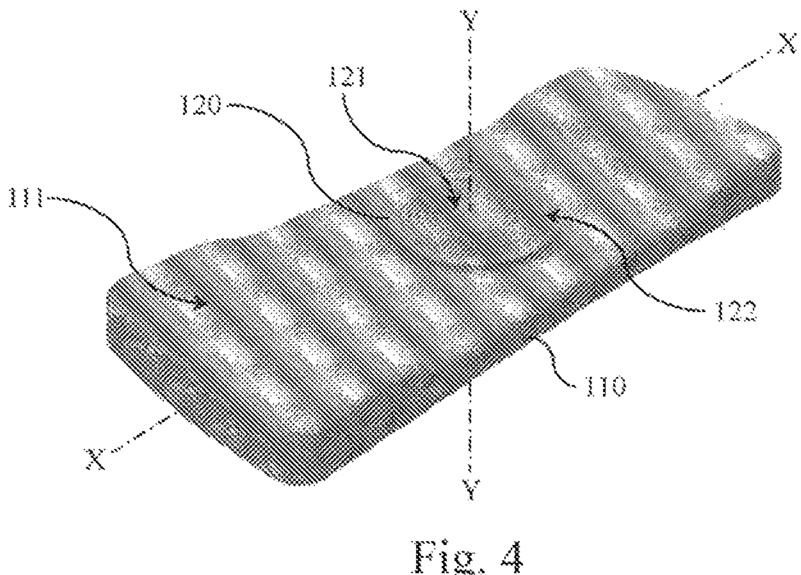
FIG. 4 depicts a perspective view of a measuring device having a sensor assembly connected thereto according to certain aspects of the invention.

The drawings as presented herein are not intended to limit the scope of the invention and are not necessarily to scale.

In the sense of embodiments of the present invention, the terms “container”, “pressurized container”, “tank” and “pressurized tank” are used interchangeably unless otherwise indicated.

Likewise, the terms “monitoring system”, “measuring system”, “sensing system” or simply “system” are used interchangeably unless otherwise indicated.

Similarly, the terms “liquid level measuring device”, “fill level measuring device” and “measuring device” are used interchangeably unless otherwise indicated and refer to a device intended to be mounted on an outer wall of a container or tank by suitable means.

Also, the terms “software application”, “app”, “mobile app” and “web app” are used interchangeably unless otherwise indicated and generally refer to software running on a device such as a mobile device (smartphone) or a computer configured to display a graphic interface for a user.

Furthermore, the term “mobile device” may refer, and is not limited, to a computer, a mobile phone, a smartphone, a tablet, a Personal Digital Assistant (PDA), a smart watch, or any other device configured to communicate with other mobile devices via protocols well known in the art.

FIG. 1 schematically illustrates a fill level measuring system 100 according to certain embodiments. The fill level measuring system 100 includes a tank 102, which is filled to a certain level with a liquid, and a measuring device 110, which is mounted on a bottom outer wall of the tank 102. The measuring device 110 is configured to emit an ultrasonic wave able to pass through the tank’s wall and travel along the liquid inside the tank 102. The fill level of the liquid inside the tank 102 is determined, for example, by a height $H_1$. When the emitted wave reaches said height $H_1$, the emitted wave is reflected to the measuring device 110. The measuring device 110 can thus calculate the “time of flight” of the ultrasonic wave emitted and reflected back to the measuring device 110. The measuring device can thus calculate the fill level ($H_1$) of liquid inside the tank 102 by considering said “time of flight” of the ultrasonic wave and other parameters such as, without limitation, the dimensions (namely, size and net volume) of the tank 102, density and temperature of the liquid inside the tank 102, ambient temperature, etc. In this configuration, the tank 102 is a horizontally mounted cylinder tank.

Reference is now made to FIGS. 2 and 3 which schematically illustrate a fill level measuring system 101 according to embodiments of the present invention. The measuring device 110 is installed preferably on an outer bottom surface of a container or tank 103 filled with a liquid or gaseous material. The material inside the container 103 may be either pressurized or not pressurized, for example, a liquefied petroleum gas such as, but not limited to, propane or butane, oxygen ($O_2$), nitrous oxide ($N_X$), anesthesia, carbon dioxide ($CO_2$), nitrogen ($N_2$), gas air, helium (He), water ($H_2O$), oils, liquid plastics, or any other liquid or gas.

Generally speaking, the tank or container 102, 103 may consist in a cylinder made of steel, and in particular it is intended for domestic use with a capacity to contain, for example, 10, 20, 30, or 40 Kg. It will be apparent to those skilled in the art that the shape, construction materials and capacity of the cylinder can be modified depending on the use, all of which are encompassed by the present disclosure.

Shape and specifications for cylinder tanks intended to contain a pressurized fuel gas are defined, for example, in the Mexican Official Norm NOM-008-SESH/SCF-2010, "Transportable Containers for Storing Liquefied Petroleum Gas", which is hereby quoted by reference.

With particular reference to FIG. 2, the measuring device 110 is shown in a first functional stage according to which an ultrasonic wave, which is depicted by the curved lines moving upwardly, with frequency and amplitude known is generated and transmitted first through the wall of the tank 103 and said emitted wave travels through the liquid until the wave reaches the liquid's surface. Then, as shown in FIG. 3, the wave is reflected back to the measuring device 110 due to the natural behavior of transmitting mechanical waves. In the latter stage, the measuring device 110 receives or senses the reflected wave, and then it is possible to calculate the time-of-travel and the level $H_2$ of liquid inside the tank 103.

As it is known in physics and by those skilled in the art, there is a direct correspondence between the time-of-flight of the ultrasonic wave and the liquid level inside the tank, namely the longer it takes to the wave to reach the surface of the liquid and get reflected on the measuring device the greater the level of liquid inside the tank; conversely, the shorter time for the wave to return to the measuring device the smaller level of liquid.

According to certain aspects of the invention, the calculation of fill level inside the tank is carried out taking account of several parameters such as the density of the liquid, which is a value known in advance, time-of-travel (also known as "flight time"), the known size of the tank, and taking into consideration some corrections in a way to be described in further detail below.

Figure 5:
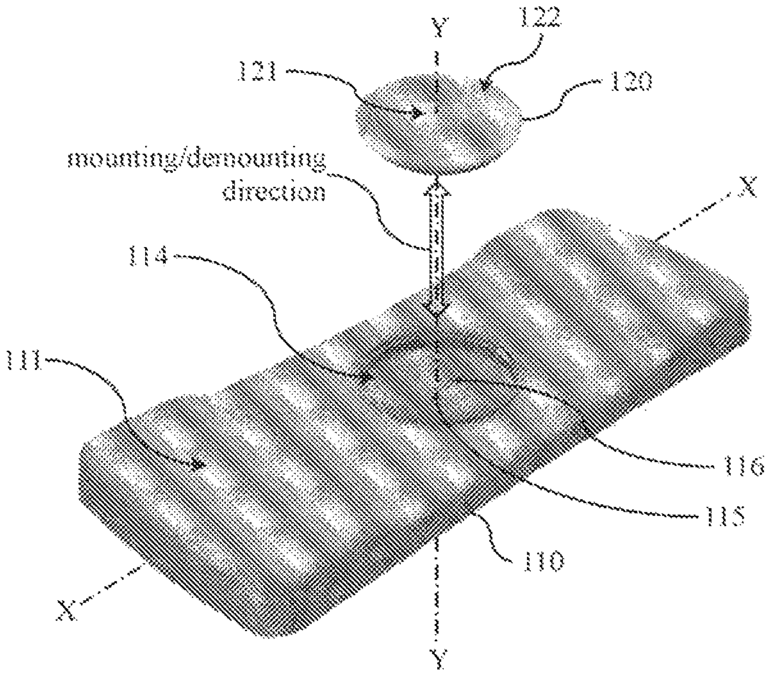
FIG. 5 depicts a perspective view of a measuring device having a sensor assembly separated from the measuring device according to certain aspects of the invention.

FIGS. 4 and 5 depict perspective views of a measuring device 110 according to certain aspects of the invention. As shown in these figures, the measuring device 110 includes a sensor assembly 120 which can be mounted or received in a sensor recess 114 arranged on a top case 111 of the measuring device 110. The sensor assembly 120 includes a lid 121 which is always observable when the sensor assembly 120 is mounted in the sensor recess 114. The sensor assembly lid 121 is formed with a number of concentric ribs or protrusions 122 which assist in the mounting of the sensor assembly 120 to the outer wall of a container or tank as described in further detail below with reference to FIG. 10.

As shown in FIG. 4, the sensor assembly 120 can be mounted and electrically connected through suitable means, for example with the use of positive and negative electrodes or pins, to the measuring device 110 such that the measuring device 110 can emit an ultrasonic wave and sense a reflected wave as described in relation to FIGS. 1-3.

As shown in FIG. 5, the sensor assembly 120 can be mounted to and demounted from the measuring device 110 in the Y axis direction. As can be seen in this figure, the measuring device 110 includes a number of pins, in particular two pins 115, 116, which pass through respective bores in the sensor recess 114. The pins 115, 116 electrically connect to the sensor assembly 120 to supply energy and data transmission between the sensor assembly 120 and the measuring device 10 as described n further detail below.

Figure 6:
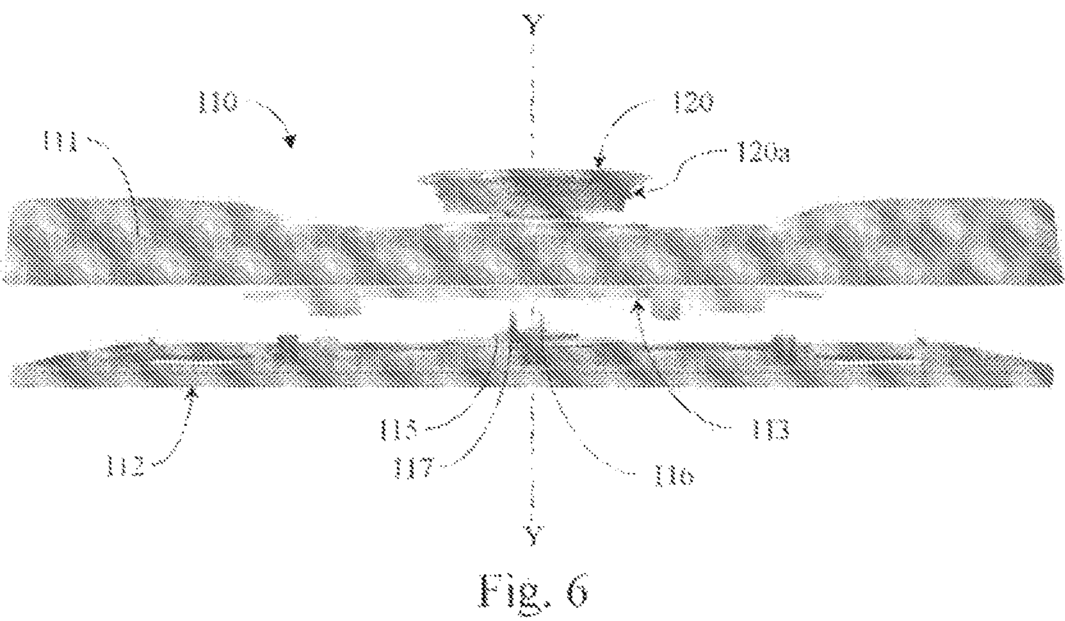
FIG. 6 is a schematic lateral exploded view of a measuring device according to certain aspects of the invention.

Reference is now made to FIG. 6 showing an exploded side view of the measuring device 110. The measuring device 110 may comprise a bottom case 112 which can be mounted to an underside of the top case 111 by means of, for example, bolts, rivets, screws, clips, or a combination thereof. The measuring device 110 also comprises a pin plate 117 on which the pins 115, 116 are mounted, and a printed circuit board 113. As can be seen, the sensor assembly 120 is separated from the measuring device 110 in the Y axis direction.

Figure 7:
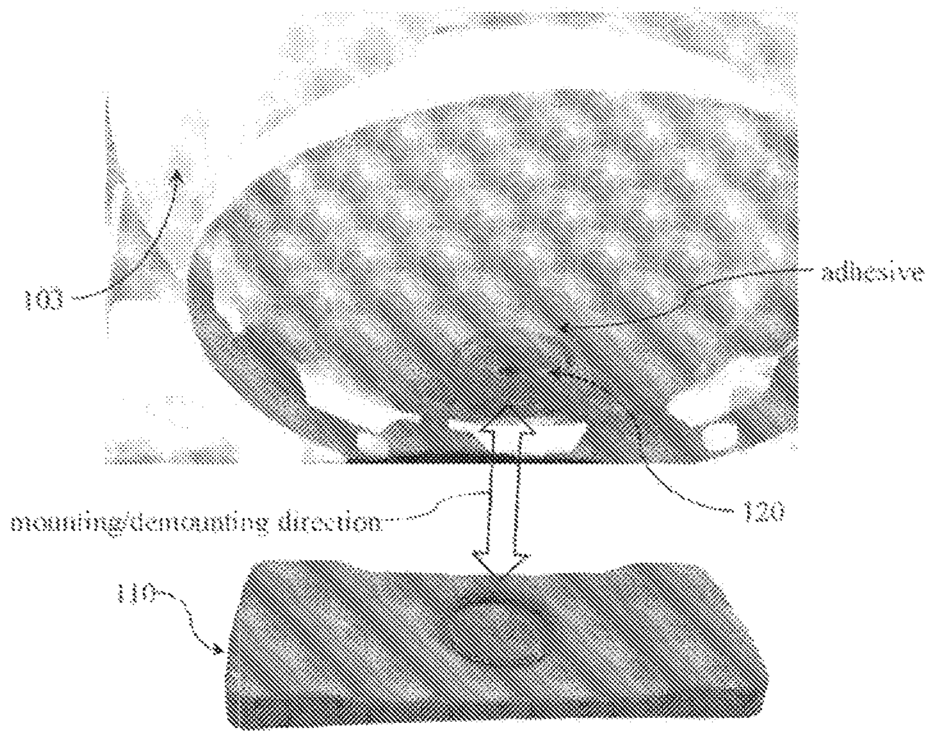
FIG. 7 is a schematic perspective view showing a sensor assembly mounted to a bottom wall of a tank and a measuring device according to certain aspects of the invention.

FIG. 7 shows a perspective view of a sensor assembly 120 fixedly mounted to a bottom outer wall of a tank 103. The mounting of the sensor assembly 120 may include, for example, applying an adhesive, preferably a non-permanent or removable adhesive. The measuring device 110 is separated and disconnected from the sensor assembly 120. According to certain aspects, the coupling agent, in particular the adhesive 140, is selected from glues suitable for bonding metal, plastic, rubber, wood, ceramic, glass, and concrete materials, or a combination thereof. In particular, the adhesive is selected of the type manufactured and commercialized under trademark Kafuter®; which is silicone adhesive glue suitable to bond metals, such as, without limitation, steel, iron, aluminum and alloys, titanium steel, galvanized iron, ferrochrome, titanium alloys, but also plastics such as, without limitation, ABS, hard PVC, polycarbonate, Plexiglas, polyurethane, polyester, nylon, bakelite, polystyrene, glass fiber reinforced plastic, carbonic acid fiber reinforced materials, etc. More particularly, the adhesive is selected from glues suitable to facilitate the pass or transmission of signals, current, or frequencies through metal and plastic materials.

Figure 8:
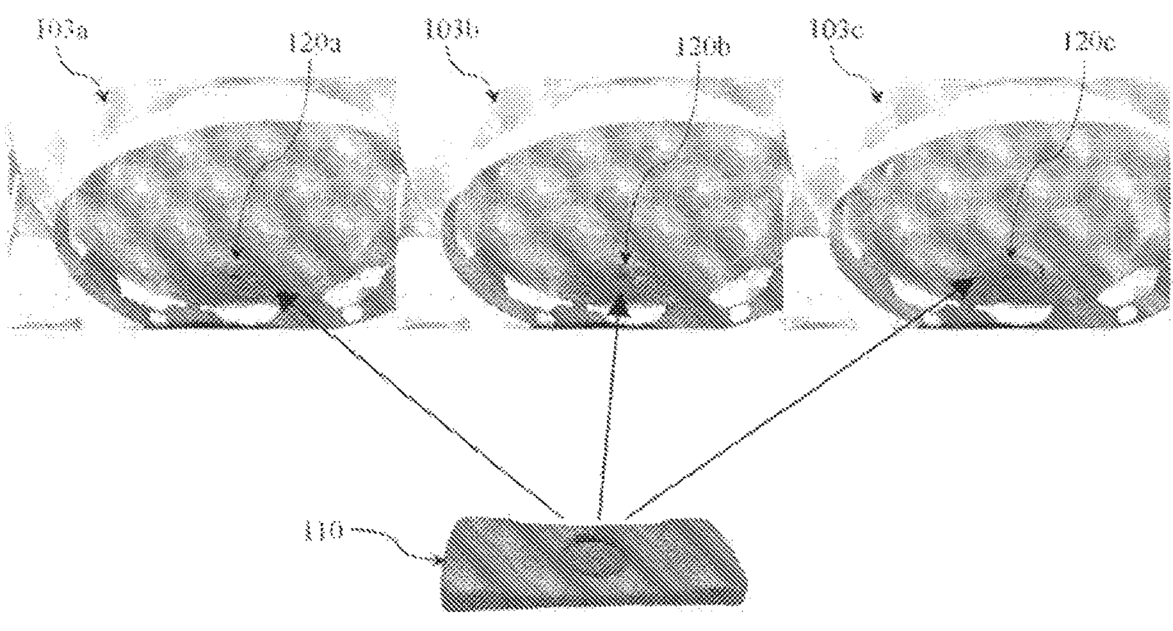
FIG. 8 depicts a plurality of sensor assemblies mounted to respective bottom walls of a plurality of tanks, and a measuring device which can be connected, one at a time, with each sensor assembly according to certain aspects of the invention.

FIG. 8 shows a plurality of sensor assemblies 120_a-c_ each of which is mounted by suitable means to a bottom outer wall of a respective tank 103_a-c_ A single measuring device 110 can be connected, one at a time, with each of the sensor assemblies 120_a-c_ to obtain corresponding measurements of the respective fill levels of the tanks 103_a-c_.

Figure 9:
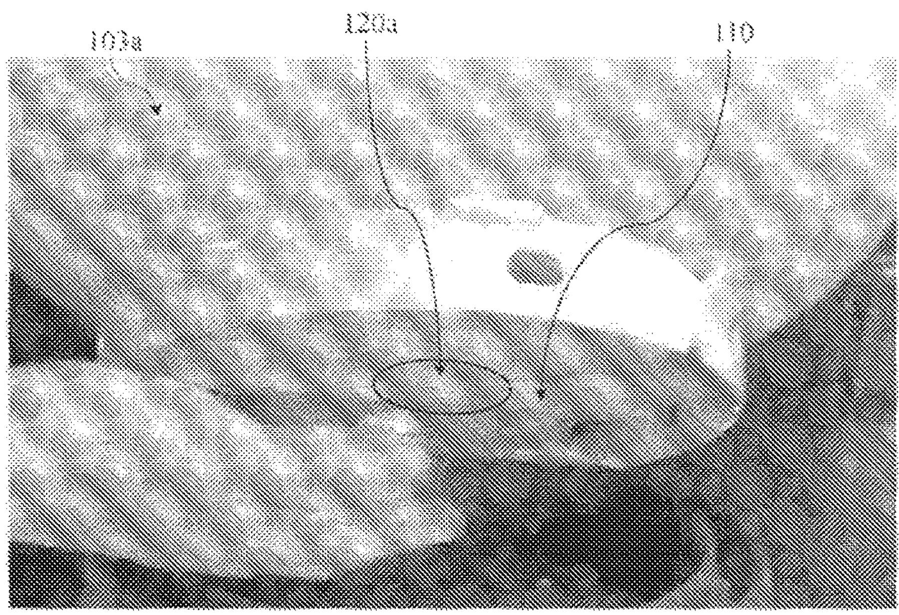
FIG. 9 schematically illustrates the mounting of a measuring device to an outer wall of a tank according to certain aspects of the invention.

Reference is now made to FIG. 9 showing the mounting of the measuring device 110 according to certain aspects of the invention. As shown in this figure, a user manipulates the measuring device 110 to bring the latter in alignment with the sensor assembly 120_a_, which in turn is mounted to the outer bottom wall of the tank 103_a_ Measurement of the fill level of the tank 103_a_ can then be performed.

Figure 10:
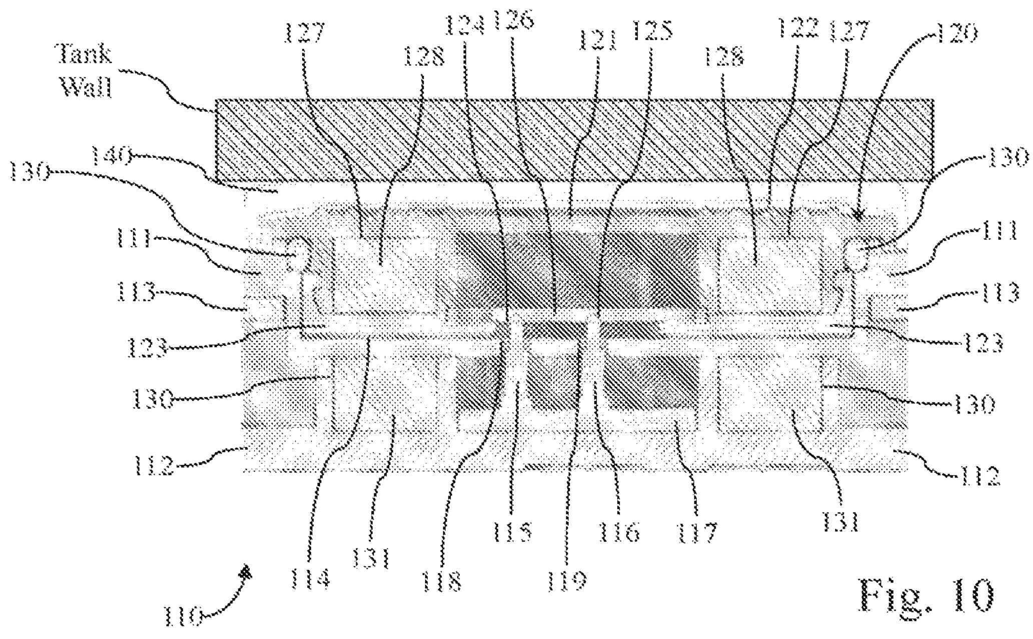
FIG. 10 schematically illustrates a cross-section view of the measuring device according to certain aspects of the invention.

FIG. 10 schematically illustrates a cross-section view of the measuring device 110 as shown in the circle shown in FIG. 9. The measuring device 110 is connected to a sensor assembly 120, which is turn is mounted to an outer wall of a tank with an adhesive 140 in between. The lid 121 of the sensor assembly 120 is formed with a plurality of concentric ribs 122 which are designed to increase the contact area between the lid 121 and the adhesive 140. In particular, the adhesive 140 acts as a coupling agent between the sensor assembly 120 and the tank wall and as an isolator to avoid interference.

As mentioned above, the top case 111 of the measuring device 110 comprises a sensor recess 114. The pins 115 and 116 are connected to a connecting plate 117 which in turn is mounted and electrically connected to the PCB 113. The pins 115 and 116 pass through respective bores 118 and 119 formed in the sensor recess 114. The bottom case 112 of the measuring device 110 comprises a first magnet receptacle 130 in which a first magnet 131 is mounted. The first magnet 131 encloses the connecting plate 117 and the pins 115, 116.

The sensor assembly 120 further includes a bottom cover 123 which is formed, on the one hand, to snap fit inside the sensor recess 114 of the measuring device 110 and, on the other hand, to hermetically close the lid 121 of the sensor assembly 120. In particular, the lid 121 and the bottom cover 123 are formed with mating connecting sections, for example, with dovetail shape. An ultrasonic transducer 126 is fixedly mounted in a cavity formed inside the bottom cover 123 and the lid 121. The ultrasonic transducer 126 electrically connects to the pins 115, 116 of the measuring device 110 by means of respective ports 124, 125. The lid 121 further comprises a second magnet receptacle 127 in which a second magnet 128 is accommodated. The second magnet 128 encloses the ultrasonic transducer 126. Further, the second magnet 128 is aligned with and magnetically attracted with the first magnet 131; i.e. the magnetic pole of the first magnet 131 facing in the direction towards the second magnet 128 is opposite the magnetic pole of the second magnet 128 facing in the direction towards the first magnet 131. The magnetic attraction between the first magnet 131 and the second magnet 128 ensures alignment and proper placement of the sensor assembly 120 in the sensor recess 114 of the measuring device 110 and also ensures correct connection between the pins 115, 116 of the measuring device 110 and the ports 124, 125 of the sensor assembly 120.

Continuing with FIG. 10, a first scaling means 130, in particular an O-ring, cooperates with the top case 111 to hermetically seal the measuring device 110. Similarly, a second sealing means 120*a* is provided to seal the sensor assembly 120.

Figure 11:
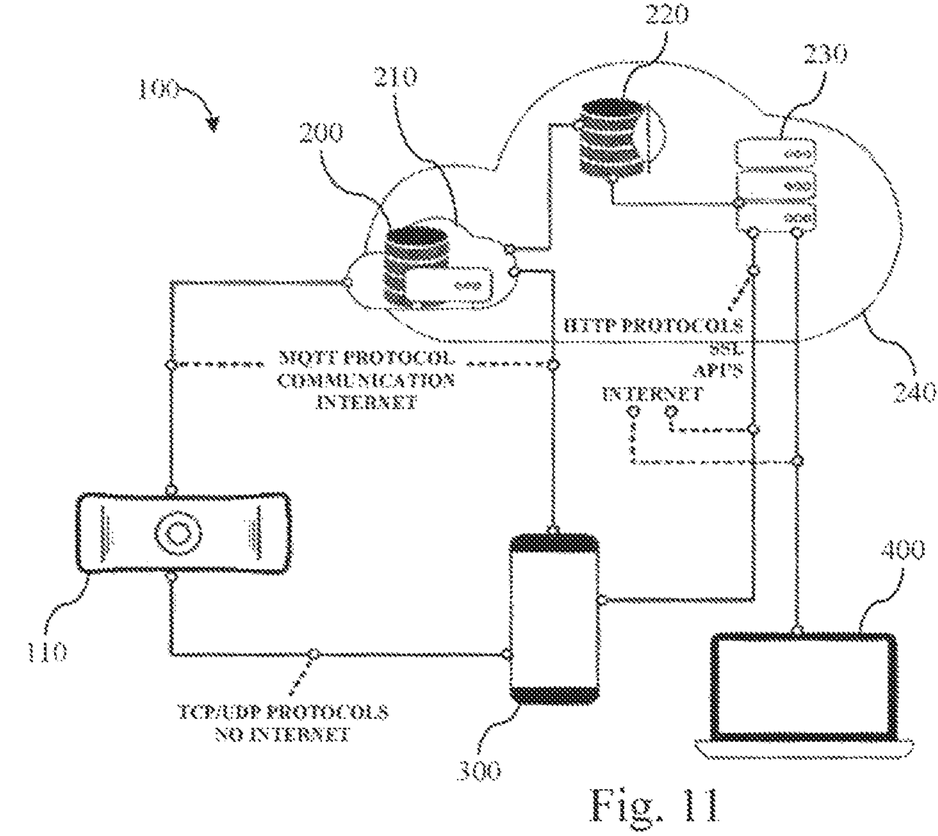
FIG. 11 schematically depicts a system for monitoring a fill level in at least one container according to aspects of the invention.

Reference is now made to FIG. 11 which schematically depicts a system 100 for measuring and monitoring a fill level in at least one container or tank according to certain aspects of the present invention. System 100 comprises at least one measuring device 110 configured to communicate with a first mobile device 300 such as, without limitation, a smartphone, via a wireless network, for example a Local Area Network (LAN).

The measuring device 110 and the mobile device 300 may communicate using any appropriate communication protocol such as, without limitation, HTTP, SSL, HTTPS, TCP/UDP, Internet Protocol (IP), MQTT, IEEE 802.11, CSMA/CA, SLP. SMTP. XMPP, SMPP, APN, LTE protocols. GPRS Tunneling Protocol User Plane (GTP-U), GTP-U Transport, Medium Access Control (MAC), Non-Access-Stratum (NAS) Protocol, Packet Data Convergence Protocol (PDCP), Radio Link Control (RLC), Radio Resource Control (RRC), S1 Application Protocol (S1AP). S1 layer 1, S1 Signaling Transport, X2 Application Protocol (X2AP), X2 layer 1, X2 Signaling Transport, or any other similar protocol or a combination thereof. The use of one or more of the aforementioned communications protocols make possible communication between the measuring device 110 and the mobile device 300 without the need for an Internet connection.

Additionally, or alternatively, the measuring device 110 is also configured to communicate with the mobile device 300 and other devices in the system 100 via Internet. The mobile device 300 is configured to run a software application (or "app" for short) such that a user may visualize the measurements performed by the measuring device 110, set a communication protocol between the mobile device 300 and the measuring device 110, among other functions for the user, as explained in detail below.

The measuring device 110 is also configured to communicate with an MQTT broker server 200, which in turn is configured to communicate with the mobile device 300 and to provide information on the software application running on the mobile device 300. MQTT protocol (an OASIS standard messaging protocol for Internet of Things (IoT)) is preferably used to establish communication between the server 200 and the mobile device 30) to reduce data flow. Server 200 is configured to communicate with other devices in the system 100 by using a Local Area Network (LAN) and/or Wide Area Network (WAN) to establish communication with the Internet 240. Server 200 is also configured to communicate with a database 210, which in turn is configured to communicate with a server 220, in particular a remote server, via Internet 240.

Preferably, at least one of the MQTT server 200, database 210, and server 220 are implemented or integrated entirely on the cloud 210, 210. MQTT protocol runs over TCP/IP protocols.

MQTT consists in a lightweight messaging protocol particularly useful for small sensors and mobile devices, it is optimized for high-latency or unreliable networks MQTT makes the system of the invention a real-time solution MQTT establishes a live connection with sensors and mobile devices to monitor the behavior of level in a tank through ultrasonic sensors in real time. In use, a sensor installed in the measuring device 110 receives a reflected signal and forwards it to the MQTT server 200. Said action is called "PUBLISH". The measurements performed by the measuring device 110 are stored in a MQTT database, which forms part of the MQTT server 200. MQTT server 200 is configured to build a specific or dedicated channel for every measuring device it may communicate with. Each said channel has its own topic to differentiate from one another.

Additionally, the mobile device 300 and/or device 400 is configured to communicate with the MQTT server 200 through interaction of a user with an app running on said device 300/400 as a SUBSCRIBER to recover the measurements stored on the database of the MQTT server 200.

Measurements carried out by a sensor of a measuring device 110 are processed through an algorithm, in a way to be described in further detail below, to calculate the current volume or fill level in a tank taking into consideration, for example, size, brand and type of the tank. This information about the tank (size, brand, type, etc.) is inputted by a user making use of the mobile devices 300 or device 400 and the respective app running on said devices.

System 100 also comprises a device 400, such as a computer, configured to communicate with the server 230 through Internet Protocol. The device 400 may also be configured to run an app, for example, to display information about the measurements performed by the measuring device 110, set a monitoring schedule, etc. as explained in further detail below.

Server 230 may also be configured to communicate with the first mobile device 300 through Internet Protocol, as is well known in the art.

Figure 12:
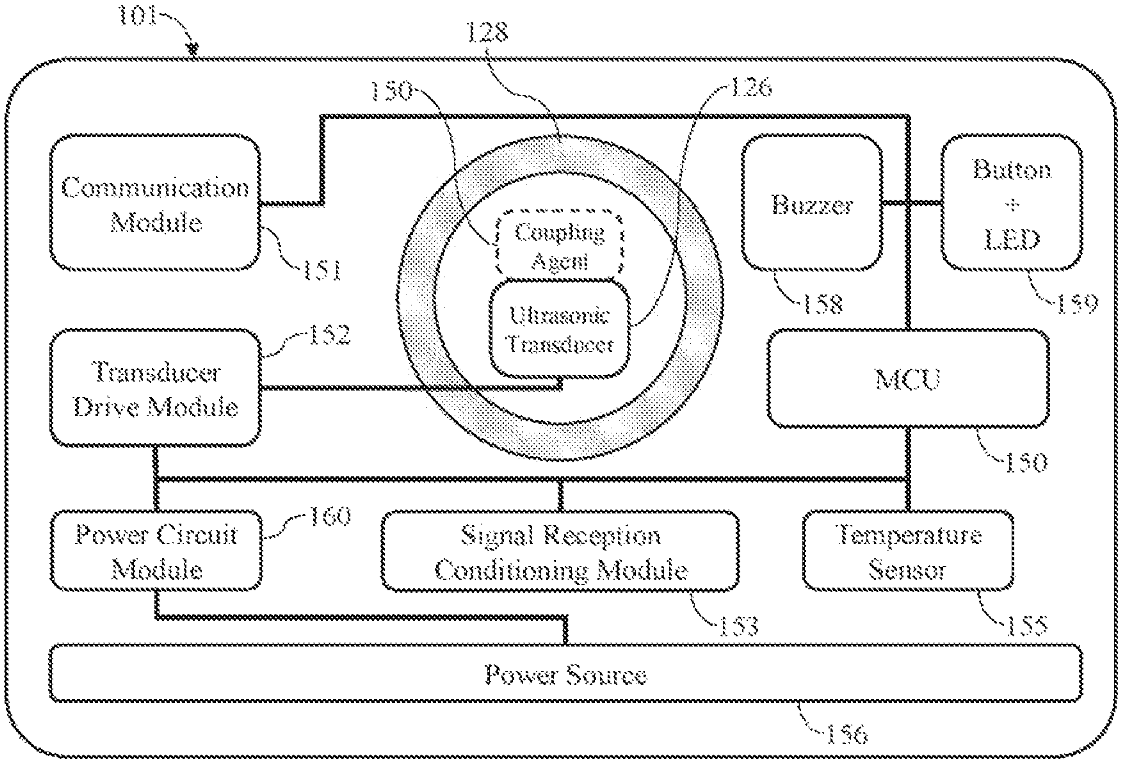
FIG. 12 schematically depicts a measuring device and its hardware components according to aspects of the present invention.

Reference is now made to FIG. 12 which schematically depicts hardware components of a measuring device 10 according to certain aspects of the present invention. Measuring device 110 comprises a Main Controller Unit 150 (or "MCU" for short), a communication module 151, an ultrasonic detection circuit including a Transducer Drive Module 152, a Signal Reception Conditioning Module 153, an ultrasonic transducer 126, and a temperature sensor 155. Measuring device 110 also comprises a power source 156, a magnetic ring formed by the first magnet 131 and the second magnet 128, a buzzer 158, and a button+LED device 159. In operation, the Transducer Drive Module 152, the Signal Reception Conditioning Module 153, the temperature sensor 155 and the Main Controller Unit 150 are energized by a Power Circuit Module 160 which is operatively connected to the power source 156.

The power source 156 is compatible with the components of the measuring device 110 and is configured with a necessary power (current and voltage) to supply electrical energy to the measuring device 110. For example, according to certain embodiments of the present invention, the power source 156 may consist in a set of at least two and up to four alkaline or rechargeable 1.2 V "AA" or 1.5 V "AAA" batteries. The MCU 150 is configured to manage the power consumption of the measuring device 110 such that it has a long standby time, thus increasing the lifetime of the power source 156.

MCU 150 is configured to control the ultrasonic detection circuit to measure the fill level (or height "$H_1$" depicted in FIG. 1 or the height "$H_2$" in FIGS. 2-3) of a liquid or gas inside a tank 101, and to communicate the measurements to a user's mobile device (300, FIG. 11) and/or to a computer (400, FIG. 3) through a wired and/or wireless network via a communications protocol, through the communication module 151 of the measuring device 110. In particular, the measurements obtained by the measuring device 110 are viewable by the user on an app running on the mobile device 300 and/or computer 400.

Communication module 151 comprises a Wi-Fi module and a GPRS module (General Packet Radio Service). Wi-Fi module is configured to act as a hotspot whereby a user can establish direct communication with a device (e.g., a mobile device, computer, etc.) without the need for an Internet connection. Wi-Fi module may also be used to establish a connection between the measuring device 110 and a local Wi-Fi network. GPRS module is configured to establish communication with the Internet 124 through cellular communication.

Measuring device 110 preferably utilizes a set of two ring magnets 128, 131 cooperating with the transducer 126. A second magnet 131 is arranged enclosing the transducer 126 inside the sensor assembly 120, whereas a first magnet 131 is arranged inside the measuring device 110. As mentioned above in relation to FIG. 10, the first magnet 131 and the second magnet 128 magnetically attract to each other to align and properly place the sensor assembly 120 in the sensor recess 114 of the measuring device 110 and also to align and connect the pins 115, 116 of the measuring device 110 to the ports 124, 125 of the sensor assembly 120.

In one non-limiting embodiment, one or more of the ring magnets 131, 128 is preferably designed such that it has a radius of about 17.5 mm, a thickness of about 4.5 mm, and an inner radius (through-hole) of about 9 mm, ±0.004 mm (tolerance). In addition, each of the ring magnets is preferably made of a Neodymium-based alloy, e.g. sintered Neodymium iron, or a similar or equivalent material.

Measuring device 110 may also be configured to include a coupling agent 140 configured to eliminate or at least reduce distortion or absorption of a wave as it "flights" from and back to the measuring device 110. Coupling agent 140 is made, for example, of a material to facilitate transmission of the wave generated by the transducer 126. Thus, coupling agent 140 can be made of a silicone-like material, such as AquaSilox® with a hardness of at least 10 and up to 30 shore scale A, which makes it very soft and flexible, and heat resistance of at least 300° Celsius. The heat resistance is important because it can deform the silicone-like material affecting the acoustic impedance of the object. In one non-limiting embodiment, a coupling agent 140 may be configured with a radius of about 2 cm, and a thickness of about 1.0 to 1.5 mm.

In use of the measuring device 110, with particular reference to FIG. 10, at least one of the ring magnets 128, 131 is substantially covered, preferably entirely covered, by the coupling agent 140 which in turn is intended to contact the outer wall of the tank, as depicted in FIGS. 2-3. Pulling force of the ring magnets 128, 131 should be sufficient to maintain the measuring device 110 attached to the metal/magnetic wall of the tank. For a non-limiting example, in one embodiment of the invention the pull force of the ring magnets 128, 131 is of at least 5.7 lb. Coupling agent 140 facilitates the transmission of the ultrasonic wave exiting from and returning to the transducer 126; said coupling agent 140 helps avoiding distortion or absorption of the ultrasound signal as it travels its path.

The coupling agent 140 is generally configured to cover the sensor's case, and is designed with a series of, in a particular embodiment, five, concentric bumps.

Figure 13:
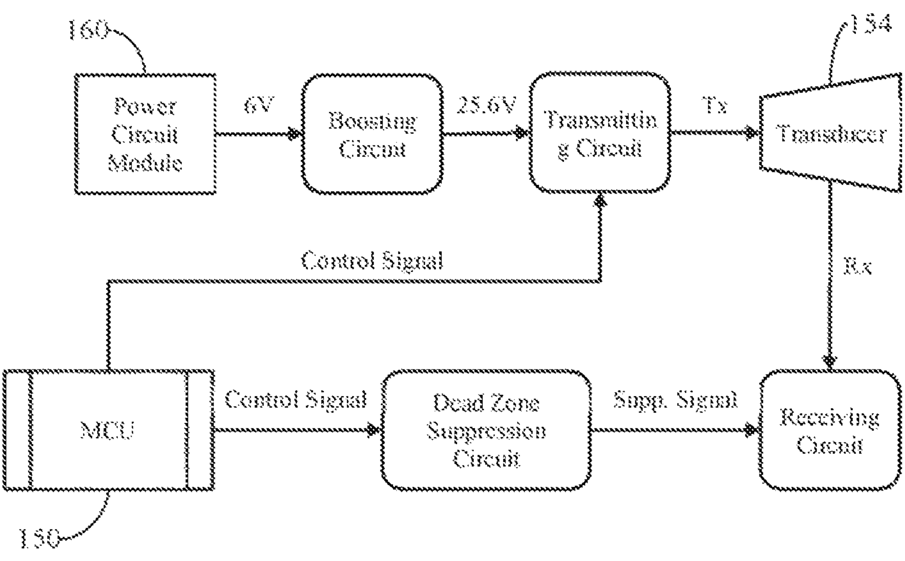
FIG. 13 is a schematic block diagram of a system for boosting a signal emitted by the transducer according to certain aspects of the present invention.

Reference is now made to FIG. 13 showing a block diagram of a method for boosting a signal emitted by the transducer according to aspects of the invention. In order to meet the penetrating power of the transmitted ultrasound signal to the tank and the contents thereof, combined with actual testing, the boosting circuit of the measuring device sets the boost voltage to a defined amount, in a particular embodiment between 20-26V that allows a received signal with the proper amplitude for the signal processing phase to the applicable metal tank thickness of 5 mm to 9 mm.

After the transducer is excited, there is an inherent aftershock signal, and reducing the duration of the aftershock signal can reduce a blind zone. The MCU plays a key role in reducing the blind zone by controlling the curve suppression signal and adjusting the number of excitation pulses and gain (as mentioned in the ultrasonic echo detection in FIG. 8 explained below).

In the sense of the present invention, the blind zone can be interpreted as the minimum fill level that can be measured by the measuring device according to certain embodiments. Any fill level below this minimum fill level is not detected or it is detected as a fill level higher than the actual value. This is the consequence of the time the system is not able to receive any signal because it is discharging from the stage of transmission. To reduce the effect of this problem, according to certain embodiments the invention can use a small signal mode which enables the circuit to detect fill level as small as 30 mm. The small signal mode transmits a signal of smaller amplitude which reduces the time the circuit needs to discharge and then the time the circuit is not able to receive any signal.

Accordingly, the ultrasonic sensor includes a high-frequency piezoelectric transducer 126 and a coupling agent 140. Transducer Drive Module 152 includes a boost circuit module to boost a driving voltage (e.g., 4.8 V or 6.0 V) acquired from the power circuit module 160 to, for example, 25.6 V. The excitation signal cooperates with the transducer 126 to generate and emit a high-frequency ultrasonic signal, for example of 2 MHz, which should be able to be transmitted through the tank's wall and reflect back to the transducer 126. Additionally, the signal may be generated as a series of pulses, which is controlled by the MCU 150. When the transducer is thus operated, a signal curve suppression module (dead zone suppression circuit) suppresses the analog signal and immediately acts to attenuate the residual vibration signal, thereby reducing the dead zone and reducing the signal oscillation at the coupling agent 140, without affecting the signal transmitted to the tank.

After the excitation signal is transmitted by the MCU 150, the curve suppression module (dead zone suppression circuit) increases the shunting of the transducer oscillation signal, and the suppression control is tuned off at the end of the dead zone. In this way, the attenuation of the aftershock signal is achieved, the signal clutter at the medium coupling is reduced, and the blind zone is reduced.

Figure 14:
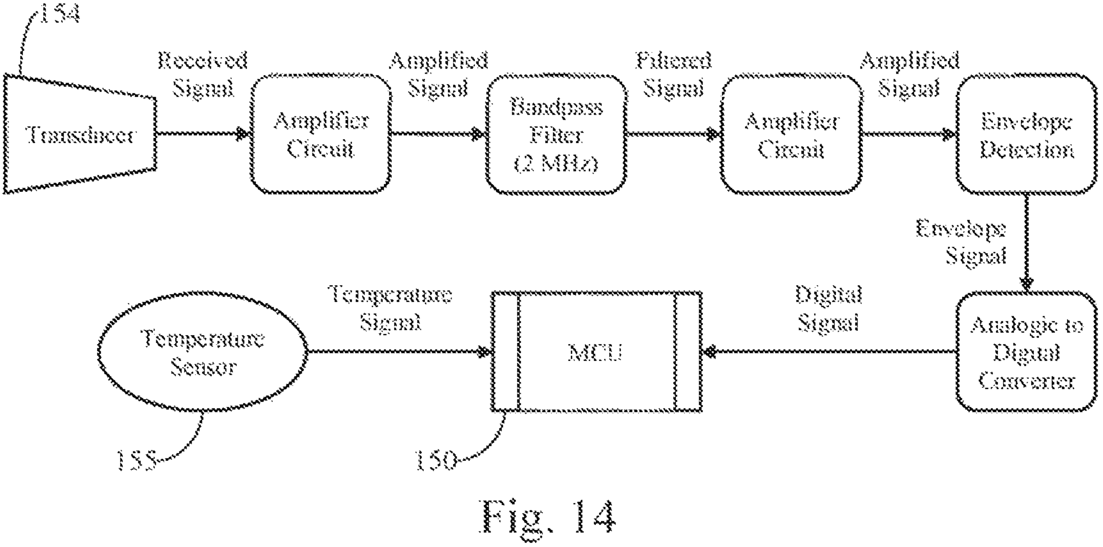
FIG. 14 is a schematic block diagram of a system for compensating a signal received by the transducer according to certain aspects of the present invention.

Reference is now made to FIG. 14 showing an exemplary method for compensating a signal received by the transducer according to aspects of the present invention. The circuit of the measuring device amplifies, filters, and detects the echo signal received by the transducer, and then transmits it to the MCU 150 for acquisition. At the same time, the time-controlled gain signal introduced can control the gain intensity, which enhances the flexibility and adaptability of the circuit. The temperature sensor 155 can detect the current ambient temperature to achieve temperature compensation for the detection of the fill level in the tank.

During operation, a first-stage op-amp plays the role of signal amplification (amplifier circuit). A second-stage op-amp and a resistor-capacitor element form a frequency-selection filter circuit. The matching with the transducer needs to be considered, so the center frequency of the frequency-selection is adjusted at a determined frequency, for example 2 MHz. Then, the signal is detected, and an envelope signal is obtained and outputted to the MCU 150. Here, the signal is converted from analogic to digital before being transmitted to the MCU 150.

Figure 15:
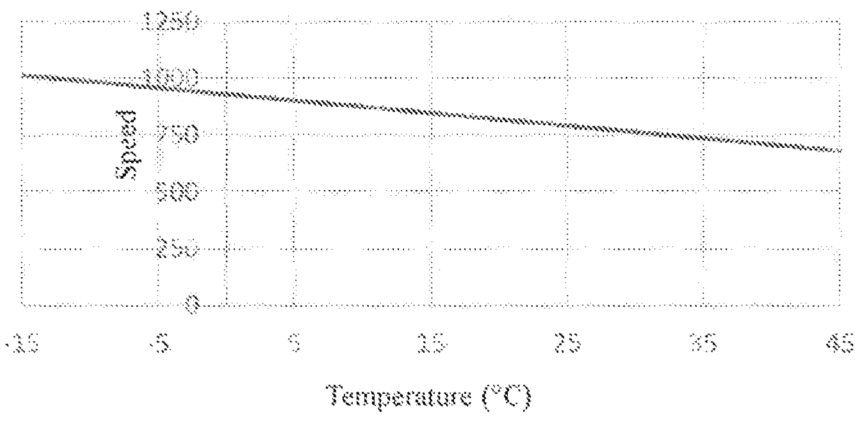
FIG. 15 is a graph showing a non-limiting exemplary relationship between temperature and travel speed of a signal through a fluid emitted by the transducer according to certain aspects of the present invention.

FIG. 15 is a graph showing the relationship between temperature and travel speed of a signal emitted by the transducer according to aspects of the present invention. As it is known in physics and in the state-of-art, density and volume of any fluid is intimately related to its temperature. The volume of a liquid Increases with a higher temperature and decreases with a lower temperature. On the other hand, it is also well known in the art that ambient temperature may vary from the temperature of a fluid inside a container, whereby it may be expected that the level calculated by a measuring device is not quite accurate if said temperature difference is not taken into account.

According to an exemplary case of use of the present invention, a tank containing propane is provided. To eliminate the error due to the difference between ambient temperature and the temperature of the fluid inside the tank, a method to compensate the temperature difference is provided.

In this exemplary method of the invention, and with particular reference to FIG. 7, the X-axis indicates the temperature in ° C. with 5 degrees increases, whereas the Y-axis indicates the speed in m/s with 250 increases. The measured echo time data is divided by a fixed distance to obtain the speed value. The measured scattered point data is based on a two-dimensional coordinate method to make the relationship between the ultrasonic transmission speed and temperature in a propane medium.

Then, a polynomial curve fitting function (e.g. "polyfit") is used for substituting the scattered data; said function is formatted as:

x=temperature 1, temperature 2, temperature 3, . . .

y=speed 1, speed 2, speed 3, . . .

P=curve_fit(x, y, N)

wherein N is 2, the linear correlation coefficient R2 of the fitting function should be greater than 0.998.

Where P is the returned Polynomial Vector, with coefficients from the highest to the lowest power, x is the Temperature of the independent variable to be fitted, y is the Speed of the dependent variable, and N is the Number of fitting samples. We put the fitting function into the device MCU program, and at different temperatures, the corresponding ultrasonic propagation velocity can be estimated, thereby obtaining the temperature compensation function.

This fitting function is inputted into the MCU 150 to obtain a temperature compensated function.

Figure 16:
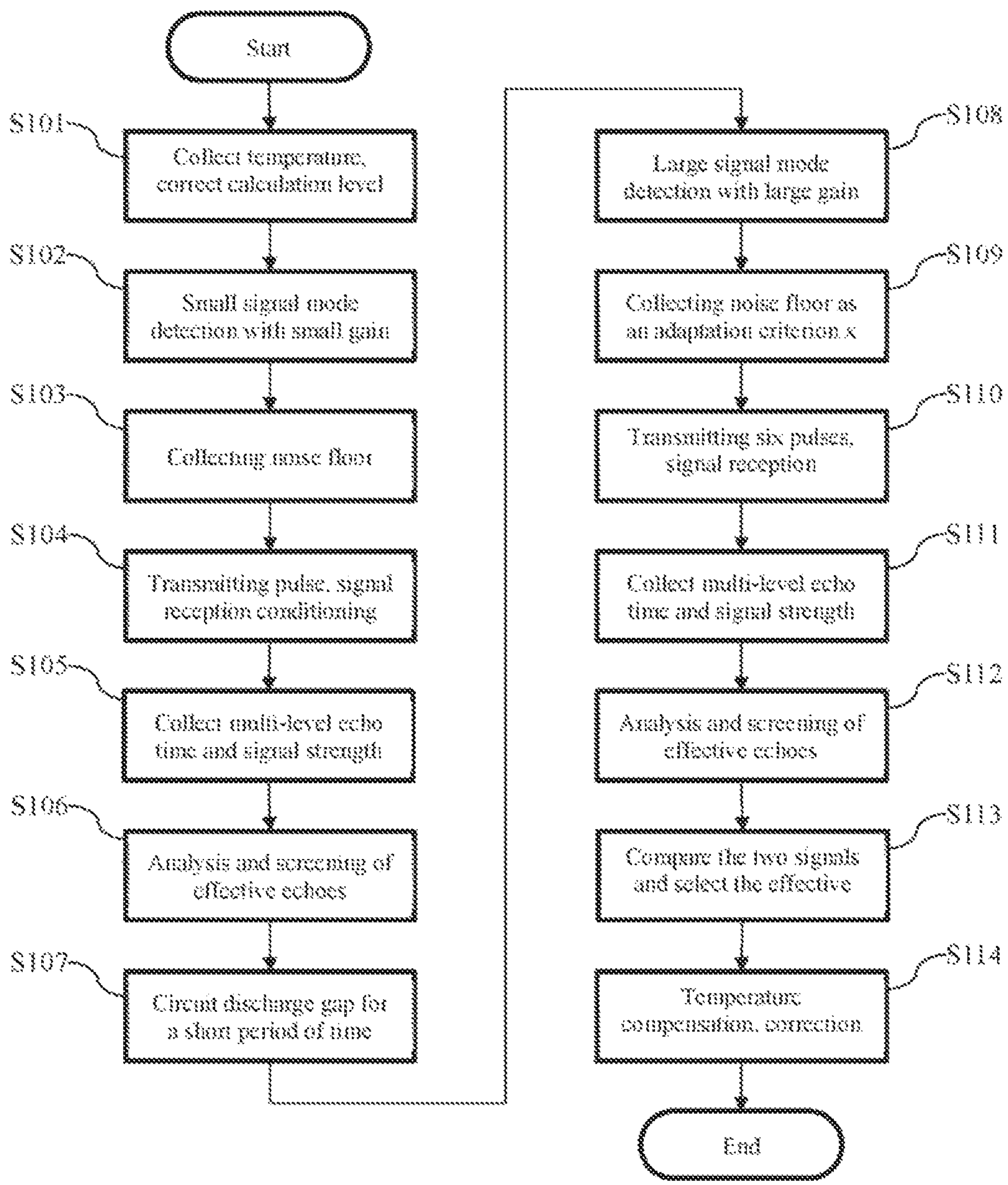
FIG. 16 shows a flowchart of a method for measuring and correcting a level value calculated with a measuring device of the present invention.

With reference now to FIG. 16, there is shown a flowchart of a method for measuring and correcting a level value calculated with a measuring device 110 according to aspects of the present invention.

As previously mentioned, the measuring device according to the invention takes account of noise and signal reference changes due to environmental changes. The measuring device collects the temperature from the temperature sensor (step S101). Then, boost is started, once the boost is stable, the measuring device starts receiving the signal conditioning circuit and turn on a small gain (step S102) Then the noise floor of the circuit is collected and adapted to filter the noise and maximize the strength of the echo signal (step S103).

Drive the transducer to emit a pulse (step S104). When the transmission is completed, the curve suppresses the analog signal to intervene immediately, from strong to weak, so as to suppress the blind zone residual vibration.

The small signal mode is responsible for detection within 80 mm of the low-level liquid level obtained from experimental data to ensure that the lower blind area is not greater than 30 mm, and the measurement liquid level is not lower than 80 mm.

Collect the data of blind spot size, multi-stage echo time, signal strength, etc. (step S105); then, analyze the multi-stage echo data to screen the effective echo (step S106).

Circuits discharge (step S107) in this step, the transducer and the circuit are discharged, such that the previous ultrasonic signal within the tank is attenuated to levels that do not interfere with the next measurement. This step allows for protecting the electric circuit from voltage changes and surges.

Use large signal mode to measure again. The result is that the transmission pulse is increased to 6 and the gain is increased (step S108).

The noise in the environment could change, because of this is necessary to collect the noise floor as an adaptation criterion x (step S109) and improved the noise filtering.

Transmitting a series of pulses, signal reception and conditioning (step S110). In this case are transmitted six pulses instead of one to measure higher levels on the tank. In particular, the series of pulses includes, for example, four pulses, namely two pairs of two pulses each to eliminate or at least reduce the error margin. It has been found that a greater number of pulses help identifying whether the measurement is correct or not. The greater the amount of pulses the higher the confidence of measurement. This corresponds to the large-signal mode detection. Compared with the small-signal mode, the energy of the transmitted signal and the gain on receiving circuit are higher with the purpose of reaching longer distances. The circuit amplifies, filters, and detects the echo signal received by the transducer, and then transmits it to the MCU for acquisition.

Collecting multi-level echo time and signal strength (step S111) There are multiple reverberations in the echo which make necessary to identify which are actual echoes and which are noisy reflections.

Analysis and screening of effective echoes (step S112). When the reverberations are identified is necessary to identify the actual echoes and analyze them The MCU collects the echo data, filters the reverberations with signal amplitude below some threshold thr, and selects the first echo signal with an amplitude above that threshold. This one corresponds to the echo of the liquid level of the liquefied gas.

The large signal mode is responsible for low-level liquid level detection. The number of transmitted pulses is obtained by the circuit and tested to ensure that the lower blind area is not greater than the small signal mode. Detection range and the measurable liquid level is not lower than the range value.

Compare the small signal and large signal measurement data. The small signal mode has a larger proportion of the short-range measurement value, and the large signal has a larger proportion of the long-range measurement value (step S113).

Select an effective echo and use temperature compensation. The mode correction calculates the level value (step S114).

Figure 17:
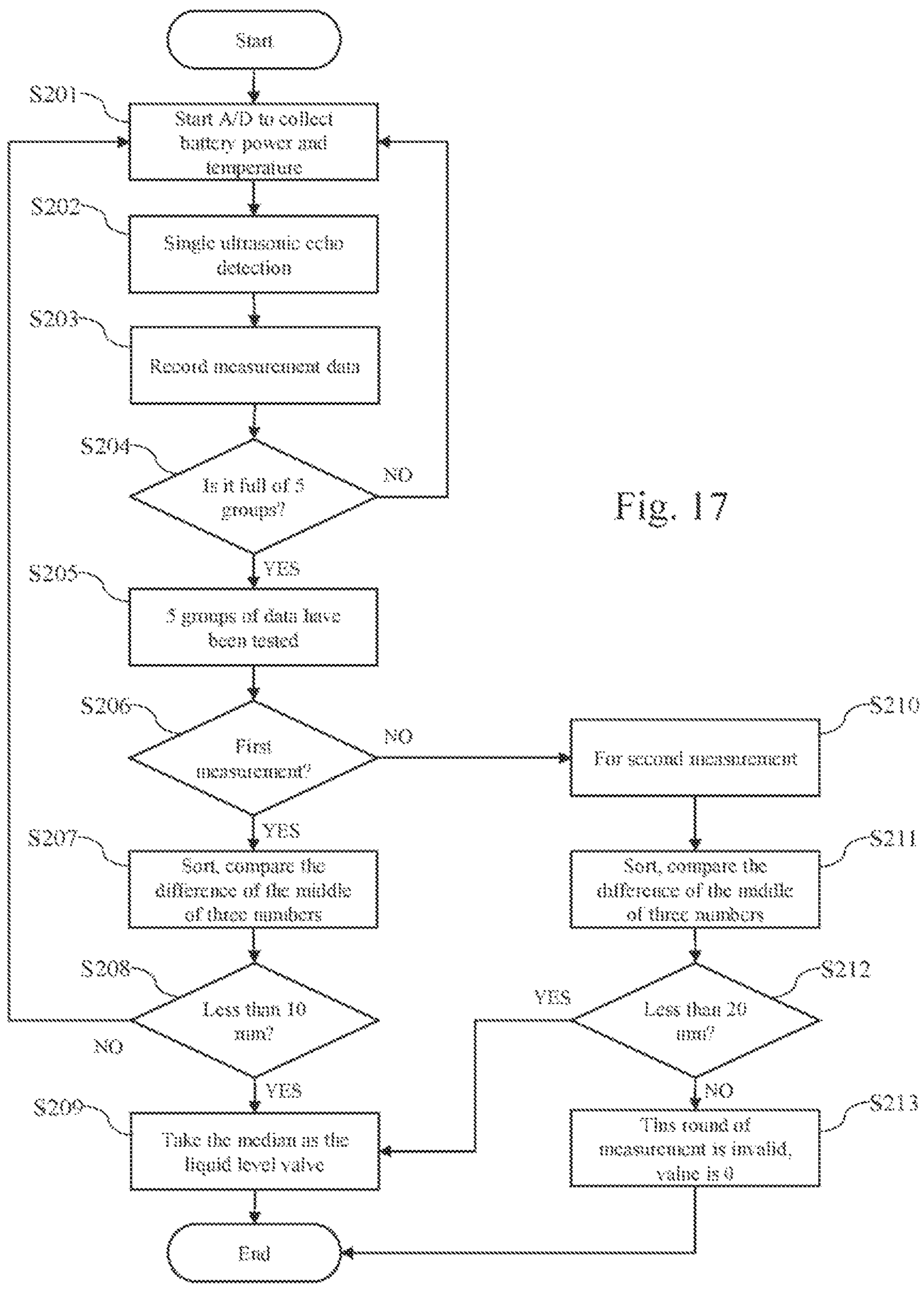
FIG. 17 shows a flowchart of a method for fill level detection and filtering according to certain aspects of the present invention.

With reference to FIG. 17, there is shown a flowchart of a method for fill level detection and filtering according to certain aspects of the present invention.

First, start the A/D converter to collect the battery power and temperature (step S201); then, perform a single ultrasonic echo test (step S202); and record the measured data (step S203); after a short period of time, repeat the measurement again (steps S201-S203); this cycle is repeated a total of 5 times to obtain the measurement Get 5 sets of data (step S204).

The method then moves to determine whether it is first measurement carried out or not (step S206). In the affirmative, the method advances to sorting the data and remove the maximum and minimum values (step S207), because they are likely to be unreliable data. If the difference between the three values is small (considering the value fluctuation when the liquid level fluctuates, set it to less than 10 mm, step S208), the measurement data is considered valid, and the median value is taken as the liquid level measurement value (step S209).

If there is a large difference between the three values, it is determined that the current measurement data is unstable, and it may cause errors. Then, the method returns to step S201, and then 5 sets of data will be measured.

Returning to block or step S206, if the measurement corresponds to a second measurement (step S210), then the method advances to analyze if the difference between the three values in the middle is small (step S211). This is because the previous detection has failed, it is easier to measure the threshold when the test is slightly relaxed when it is retested, and it is set to less than 20 mm (step S212). In the affirmative, the method advances to step S209 to take the median value as the level value. In the negative. i.e. if the difference between the three values in the middle is large, it is judged that the current measurement data is unstable and may cause errors. It is thus considered that the current measurement fails, and the liquid level value defaults to 0 (step S213).

Due to the consideration of power consumption, the measurement is repeated up to two times. In most cases, the whole machine handles the sleep standby state. The MCII wakes up once every 20 minutes for liquid level measurement; this is configurable to less or more time.

The circuit adopts a flexible low-power design, and the MCU can cut off the power of circuit modules that do not need to work at any time. The minimum working current of the product under sleep state is less than 12 μA.

The power consumption parameters of the whole machine are shown in the following table 1 (average current measured when the power supply is 6 VDC);

TABLE 1

| Parameter | Value | Unit |
|---|---|---|
| Working status (WIFI networking) | ≤90 | mA |
| Working status (WIFI is not connected) | ≤20 | mA |
| Hibernation | ≤12 | μA |

MCU Power Control Logic

1) In most cases, the device is in sleep mode;
2) Automatically wake up when the 20-minute work cycle is reached, start the corresponding module circuit, and perform data detection such as liquid level and battery power.
3) If it is detected that the change of the liquefied gas level exceeds the set threshold (default 10 mm), or when the timing report time is reached, the WIFI module is turned on to report data once online;
4) The device's working cycle, liquid level change threshold, and regular reporting time can be set by the APP through a WIFI connection.

Under normal temperature working conditions, the power source is configured to provide a desired power for a desired operational lifespan. For example, according to certain aspects of the invention, 4 times batteries (each having a capacity of about 800 mA·H) are connected in series. WIFI can be configured to work for a determined amount of triggers; for example, no more than 4 times a day. When the user does not operate the buttons, the router network status is normal. After accelerated aging test, combined with theoretical calculation, it is concluded that the use time is not less than 8 months.

The product has a long working time, ensuring energy saving, environmental protection, economy, and improving user experience.

The methodologies described herein may be implemented by various means depending upon the application. For instance, these methodologies may be implemented in hardware, firmware, software, or any combination thereof.

The aspects described in the present specification can be carried out in a variety of ways depending on the needs. Modifications or variations to adapt the invention to solve those needs will be apparent to those skilled in the art. Such modifications or variations are intended to be included in the present disclosure.

What is claimed is:

1. A measuring device for measuring the fill level of a liquid gas inside a container, comprising:

a measuring device body comprising a top case with a sensor recess and a bottom case configured to be mounted to the top case;

a detachable sensor assembly configured to be coupled in the sensor recess;

a coupling agent configured to couple the detachable sensor assembly to the container independently of the measuring device body;

an ultrasonic transducer mounted to the bottom case;

a magnet enclosing the ultrasonic transducer;

and a plurality of pins configured to connect the detachable sensor assembly to the measuring device body, wherein the detachable sensor assembly comprises a lid having a plurality of ribs, wherein the detachable sensor assembly comprises an adhesive and is configured to be mounted to the container by the adhesive, and wherein the detachable sensor assembly is configured to snap fit with the recess.

2. A system for measuring the fill level of a liquid gas inside a container, comprising:

the measuring device of claim 1;

at least one sensor assembly;

a Message Queuing Telemetry Transport (MQTT) server;

a database;

at least one mobile device; and a main control unit configured to control the measuring device and the sensor assembly;

wherein the measuring device is configured to communicate with the at least one mobile device through a communication network, and wherein the main control unit is configured to control the measuring device and the sensor assembly based on parameters stored in the MQTT server, the database or the mobile device, the parameters communicated to the main control unit via the mobile device.

* * * * *